Aug. 9, 1949.                E. E. MARTIN                2,478,540
                    TAKE-UP HOSE REELING EQUIPMENT
Filed May 17, 1948                              2 Sheets-Sheet 1

EARNEST E. MARTIN,
INVENTOR.

BY

ATTORNEY.

Aug. 9, 1949.                  E. E. MARTIN                  2,478,540
                        TAKE-UP HOSE REELING EQUIPMENT
Filed May 17, 1948                                        2 Sheets-Sheet 2
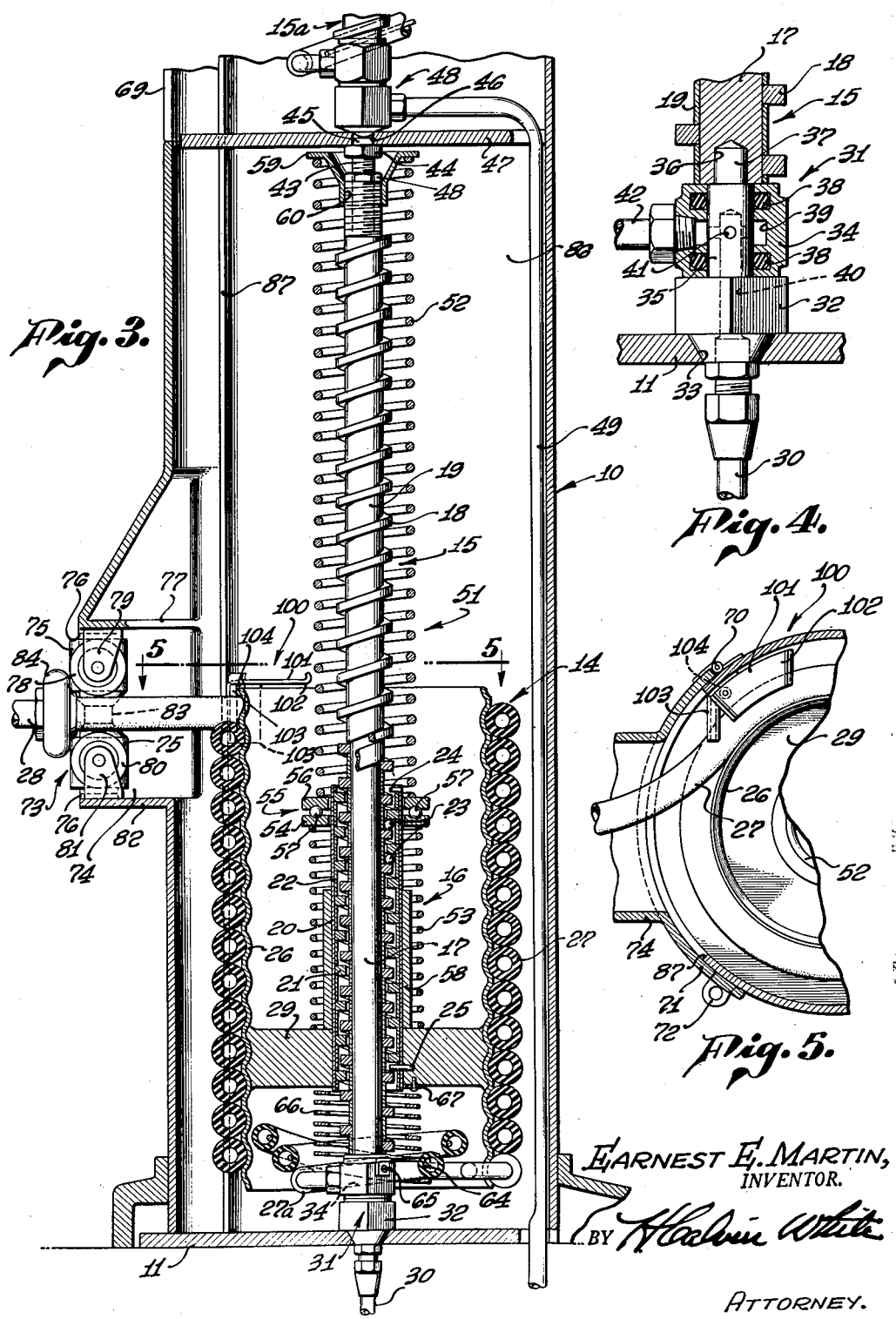
EARNEST E. MARTIN,
INVENTOR.
ATTORNEY.

Patented Aug. 9, 1949

2,478,540

UNITED STATES PATENT OFFICE 2,478,540

TAKE-UP HOSE REELING EQUIPMENT

Earnest E. Martin, Pasadena, Calif., assignor to Universal Properties, Inc., Los Angeles, Calif., a corporation of California Application May 17, 1948, Serial No. 27,447

19 Claims. (Cl. 299—77)

This invention has to do with improvements in flexible line reeling mechanisms, and particularly automatic take-up hose reels so constructed and accommodated as to be highly advantageous for automobile service station use. More specifically, the invention is directed to improvements in the mechanisms disclosed in my earlier application Serial Number 786,418, filed November 17, 1947, on Reeling mechanism, and my co-pending application Serial Number 17,302, filed March 26, 1948.

The present type of line reeling device comprises a winding drum mounted for both rotational and axial movements, preferably by associating the drum with a nut carried by a screw shaft, the pitch of which is such that the nut travels along the shaft in response to pressure applied axially to the nut or drum. This type of mechanism is particularly advantageous as applied to service station hose reeling, in that it permits accommodation of the drum within a housing adaptable also for the support of other equipment, and permits winding and paying out of the hose at a single location through the housing wall.

One of my major objects is to provide for actuation of the winding drum throughout its length of axial travel, by spring thrust applying to the drum a winding force in that axial displacement of the drum in a hose unwinding direction occurs against the spring resistance. Particularly contemplated in connection with the drum actuation, is the use of a single spring, or plural springs, interposed axially between the drum and its housing and operable to fully and quickly wind the hose. Where plural springs are used, initial winding displacement of the drum may occur, for the most part under the influence of a stronger spring, while final travel of the drum at the desired rate is effected by the thrust of a precompressed weaker spring.

A further object is to provide a novel actuating spring and drum association according to which I employ a coil spring carried about the screw shaft and resisting displacement along the shaft of the nut and drum. The spring characteristics and action may be so predetermined as to enable the spring to impart quick initial winding acceleration to the drum, and continued thrust throughout its take-up range to assure active final winding of the hose.

Assurance of minimum frictional resistance to smooth take-up of the hose throughout its winding range, is given by an improved guide roller arrangement, the latter having the further feature of being so associated with the drum housing and a side closure, as to permit convenient removal of the hose for accommodation of its free end within the housing, when the closure is opened.

Further contemplated is a novel association of a column serving as a housing for one or more hose reeling units, and as a support for a utility box at the top, the relation of the parts giving a particularly compact arrangement with respect to the entire equipment accommodated in a structure of given height.

The invention has various additional features and objects such as the drum and shaft mounting, the hose supply connection and its association with the drum, and various other improvements, all of which together with the details of an illustrative embodiment will be understood to better advantage from the following description of the accompanying drawings, in which:

Fig. 3 is a similar view taken through the lower portion of the housing and showing the air hose winding unit, this view representing a variational embodiment in that the drum is actuated by a plural spring arrangement;

Fig. 4 is an enlarged sectional view of the swivel joint at the bottom of the lower winding unit shown in Fig. 3;

Fig. 5 is a fragmentary section taken on line 5—5 of Fig. 3; and

Figures 1, 2, 6:
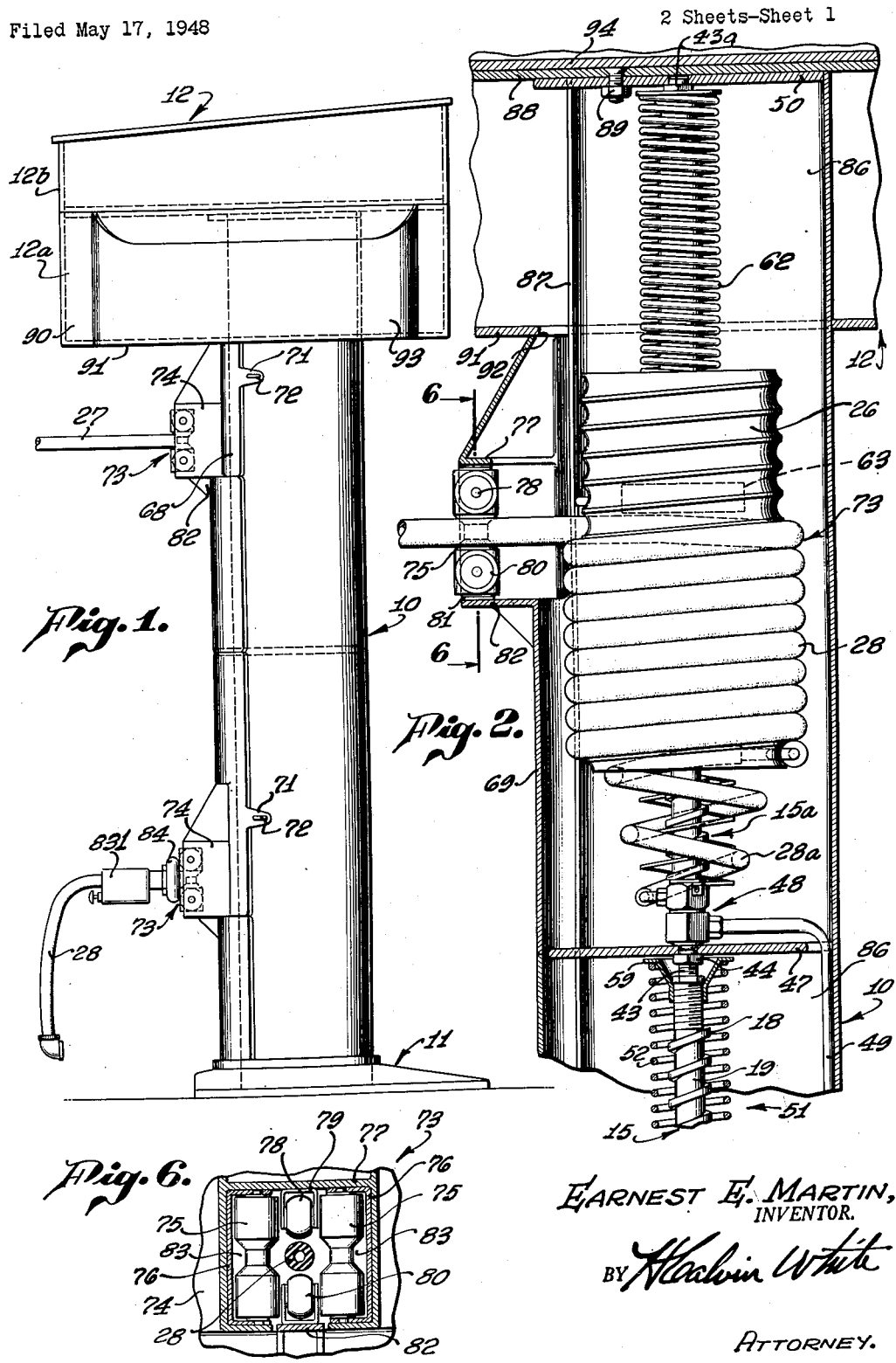
Fig. 1 is a view showing the hose winding mechanism housing and utility box assembly in side elevation.
Fig. 2 is an enlarged fragmentary sectional view taken through the upper portion of the housing and showing the water hose winding mechanism.
Fig. 6 is a fragmentary section taken on line 6—6 of Fig. 2.

As typically embodied in a water and air dispensing assembly for service station use, the invention is shown to comprise a tubular column 10 supported on an appropriate base 11 and carrying the utility box structure generally indicated at 12, the column serving as a housing for the water and air hose winding mechanisms 13 and 14 individually illustrated respectively in Figs. 2 and 3. Since the particular construction of the two hose winding units 13 and 14 is the same, corresponding parts in each are given the same reference characters.

Referring first to Fig. 3, each unit comprises a screw shaft 15 in axial alinement with the housing 10 and carrying a nut 16 which travels vertically on the shaft in response to winding and unwinding of the hose. While it is contemplated that the shaft and nut may have any desired formation, it will suffice to describe the screw shaft 15 as comprising a base shaft 17 to which is applied a preformed spiral thread 18, the turns of which are maintained in accurately spaced relation by a spirally wound spacer band 19. Similarly, the nut 16 comprises a cylindrical shell 20 within which is inserted a preformed spiral thread 21, the turns of which are separated by a spiral spacer ribbon 22. Rotation of the nut about and along the shaft is facilitated by the placement of ball bearings 23 within the nut between the shaft and nut threads, displacement of the ball bearings out of the nut being prevented by suitable means, such as pins 24 and 25. It may be mentioned at this point that the pitch of the shaft and nut threads 18 and 21 is made sufficiently great that force applied axially of the nut will cause it to rotate along the shaft. Merely as an illustration, the thread pitch or lead on a shaft of 5/8" diameter at the base of the threads, may be about 5/8".

The nut 16 carries a winding drum 26, preferably corrugated in conformance with the spiral convolutions of the hose 27 or 28, the drum being integrated with the nut as by a body of lead 29 solidified against the nut shell 20 and the inside corrugated surface of the drum. The size or diameter of the contacting hose convolutions or turns are made to correspond with the shaft thread pitch in such relation that upon one complete revolution, the drum and nut will travel axially of the shaft a distance corresponding to the center spacing of the hose convolutions, thus permitting the hose to be pulled from or fed to the drum at a single or fixed location longitudinally of the shaft and drum assembly.

Air is supplied to the hose 27 from line 30 connecting with a swivel fitting generally indicated at 31, see Fig. 4. The fitting comprises a stationary section 32 seated within an opening 33 in the base 11, and a swivel section 34 rotatable about the reduced diameter portion 35 of section 32. Shaft 15, supported at its lower end by reception in its end bore 36 of the pin end 37 of the fitting section 32. The swivel section 34 contains seal rings 38 at opposite sides of an annular recess 39 which receives air from line 30 through passages 40 and 41, the air being discharged from recess 39 through turns of flexible tubing 42 connecting with the hose 27. The upper end of the shaft 15 is supported by screw 43 threaded into the shaft and having beyond the head 44 an end projection 45 received within opening 46 in the stationary housing partition 47. Screw 43 is held in the illustrated position by tightening the lock nut 48 against the end of the shaft. But regardless of the lock nut, screw 43 may be turned out of the plate opening 46 to free the shaft and drum assembly for removal from the housing.

The upper winding unit 13 is provided with a bottom swivel fitting 48, similar to the described fitting 31, and which is releasably seated within the parts opening 46. Water is supplied to the fitting by way of pipe 49 which may be run up within the housing from the base, or as shown in Fig. 3. Shaft 15a of the upper unit is releasably secured to the top housing plate 50 by screw attachment at 43a similar to the previously described screw 43 and nut 44.

Upward displacement of the winding drum 14 and nut 16 is resisted by coil spring means 51 surrounding the shaft 15, which according to the showing of Fig. 3 may comprise upper and lower coil springs 52 and 53 respectively stronger and weaker in resistance to axial compression. Spring 53 is confined between the lead mass 29 and the lower race ring 54 of a roller bearing assembly 55 including also the upper ring 56 and ball bearings 57. Compressibility of spring 53 is limited by the engageability of ring 54 with the end of a stop sleeve 58 carried by the drum and nut assembly. Spring 52 is confined between ring 56 and keeper 59 which is threaded at 60 on the shaft for adjustment axially thereof to vary the compression range, and therefore the resistance and thrust of the coil springs, within the operative range of the drum travel.

As illustrated in Fig. 2, the drum may be actuated throughout its hose winding travel by a single coil spring 62, the characteristics and properties of which may be selected to enable the spring to exert against the drum a sufficiently strong thrust toward the end, as well as the starting of the reeling-in movement, as to assure rapid and complete spooling of the hose. Here, rotation of the drum about the spring is permitted by engaging the lower end of the spring against the roller bearing assembly 63.

While it is possible to transmit the drum rotation to the upper section 34 of the swivel fitting 31 by way of the bottom turns 27a or 28a of the hose itself, aided by the effect and reinforcement given the hose as by an internal resilient wire 64, it is preferred to transmit the drum rotation to the swivel section independently of the hose. For this purpose, the fitting sleeve 34 may be attached at 65 to a spiral flat section element 66 attached at 67 to the drum, the form of the element permitting sufficiently positive transmission of force from the drum to the swivel section, while allowing axial movement of the drum throughout its range of travel.

The housing 10 has a pair of side doors 68 and 69 with hinges at 70, see Fig. 5, the free edges of the doors carrying projections 71 which receive the housing-carried keepers 72 through which locks may be inserted. The hoses 27 and 28 enter the housing through guide roller assemblies 73 carried by the doors 68 and 69, and specifically within the guide housing shells 74 formed integrally with the doors. As best illustrated in Fig. 6, each guide roller assembly 73 comprises a pair of side rollers 75 journaled within carrier brackets 76 fitted within the square cross section wall 77 of the housing, and an upper roller 78 supported by its bracket 79. A lower roller 80 is carried by bracket 81 secured to a stationary support 82 carried by and projecting outwardly from housing 10 directly beneath the door. Rollers 75 are recessed at 83 intermediate their ends, to permit wide angle horizontal deflection of the hose from the housing, while imposing such low frictional resistance to movement of the hose as to assure its take-up from whatever degree the hose may have been horizontally deflected. Rollers 78 and 80 of course confine the hose vertically, giving free-rolling support.

Under conditions of service use, the air hose 28 will carry at its outer end a fitting, such as the conventionally illustrated air valve 83l, for control of the tire air delivery, and may carry also a bumper 84 engageable against the guide assembly 73. As will be understood, the water hose 27 may carry the usual water dispensing valve or faucet. At such times as the service station is closed, it is desirable that the hoses and their dispensing end fittings be locked within the housing 10. Accordingly, when swung open, the doors 68 and 69 carry with them the guide rollers 75 and 78, while rollers 80 remain stationarily mounted on the housing. The hoses then may be withdrawn downwardly between the rollers 75 and inserted, with their end fittings, within the housing 10 and inside the compartments 86 above the winding drums. Then when again closed, the doors 68 may be locked to prevent access to the interior of the housing.

At this point it may be observed that when door 69 is opened, the vertical extent of its housing opening is sufficient to permit a withdrawal of the lower unit 14, upon loosening of the stud 43 and disconnection of the line 30, as previously explained. When the upper door 68 is opened and cash box assembly 12 removed from the housing, the exposed vertical extent of the housing opening 87 is sufficient to permit removal of the upper unit 13.

Referring now to the mounting of the cash box 12, the latter is shown to comprise a lower section 12a having a top plate 88 secured by bolt 89 to plate 50 in the top of the housing 10, and having side walls 90 depending below and about the top portion of the housing column. Section 12a may also have a bottom wall 91 containing the opening 92 for reception of the housing column. At opposite sides of the column, walls 90 carry integrally formed receptacles 93 for service station utilities of various sorts. The upper section 12b of the assembly 12 constitutes the cash box proper, having a bottom 94 supported on the lower section top plate 88, and preferably so associated therewith that section 12b may be separately removed, leaving the lower section 12a attached to the housing column.

Further provision may be made for assuring accurate guided relation between the hose and drum at the location at which the hose passes from the drum to the guide assembly 73. Referring to Figs. 3 and 5, a stationary guide, generally indicated at 100, comprises a bracket 101 secured to the inside surface of the housing 10, and having an upper guide flange 102 and a lower guide projection 103, both of which project inwardly of the housing sufficiently to prevent vertical displacement of the hose from retained alinement with the spiral recess in the drum surface. If displaced outwardly toward the housing, the hose is guided by engagement with a small cylindrical roller 104 carried by the bracket between the top and bottom guides 102 and 103.

I claim:

1. A reeling mechanism comprising a winding drum, a mounting permitting rotational and axial movement of the drum, and a pair of springs operable sequentially to exert axial force against and displace the drum rotationally and axially throughout a predetermined range of winding travel.

2. A hose reeling mechanism comprising a tubular housing having an opening for passing the hose, a winding drum to carry the hose and mounted in said housing for rotational and axial movement to permit withdrawal and take-up of the hose through said opening, and a pair of springs operable sequentially to exert axial force against and displace the drum rotationally and axially throughout a predetermined range of winding travel.

3. A reeling mechanism comprising a screw shaft, a nut on the shaft, a winding drum surrounding the shaft and associated with the nut, the drum and nut being rotatable and movable longitudinally of the shaft in response to force applied axially of the drum and nut, and a coil spring surrounding the shaft and acting to apply said force, the drum being displaceable from a starting position to compress said spring upon rotation of the drum in an unwinding direction and the spring then acting to return the drum to said starting position.

4. A reeling mechanism comprising a screw shaft, a nut on the shaft, a winding drum surrounding the shaft and associated with the nut, the drum and nut being rotatable and movable longitudinally of the shaft in response to force applied axially of the drum and nut, and a pair of relatively rotatable coil springs surrounding the shaft and acting sequentially to apply force to the drum axially thereof.

5. A hose reeling mechanism comprising a tubular housing having a hose passing opening, a screw shaft extending longitudinally within the housing, a nut on the shaft, a hose winding drum surrounding the shaft and rigidly connected with the nut for rotational and axial movement therewith to permit withdrawal and take-up of the hose at the fixed location of said opening, and a coil spring surrounding the shaft and applying to the nut and drum axial force imparting rotational and axial movement thereto in a take-up direction.

6. A hose reeling mechanism comprising a tubular housing having a hose passing opening, a screw shaft extending longitudinally within the housing, a nut on the shaft, a hose winding drum surrounding the shaft and associated with the nut for rotational and axial movement therewith to permit withdrawal and take-up of the hose at the fixed location of said opening, and a pair of coil springs surrounding the shaft and operable sequentially to apply to the nut and drum axial force imparting rotational and axial movement thereof in a take-up direction.

7. A hose reeling mechanism comprising a tubular housing having a hose passing opening, a screw shaft extending longitudinally within the housing, a nut on the shaft, a hose winding drum surrounding the shaft and associated with the nut for rotational and axial movement therewith to permit withdrawal and take-up of the hose at the fixed location of said opening, means comprising a spring surrounding the shaft and operable to apply to the nut and drum longitudinally of the drum axis a force imparting rotational and axial movement thereof in a hose take-up direction, said spring rotating with the nut and drum.

8. A hose reeling mechanism comprising a tubular housing having a hose passing opening, a screw shaft extending longitudinally within the housing, a nut on the shaft, a hose winding drum surrounding the shaft and associated with the nut for rotational and axial movement therewith to permit withdrawal and take-up of the hose at the fixed location of said opening, a coil spring surrounding the shaft and acting to apply to the drum axial force imparting rotational and axial movement thereto in a take-up direction, and adjustable means for variably compressing said spring to regulate the spring force transmitted to the drum.

9. A hose reeling mechanism comprising a tubular housing having a hose passing opening, a screw shaft extending longitudinally within the housing, a nut on the shaft, a hose winding drum surrounding the shaft and associated with the nut for rotational and axial movement therewith to permit withdrawal and take-up of the hose at the fixed location of said opening, spring means for applying to the drum axial force imparting rotational and axial movement thereto in a take-up direction, and mountings releasably retaining both ends of said shaft in the housing to permit removal of the shaft from the housing.

10. A reeling mechanism comprising a winding drum, a mounting supporting the drum for both rotational and axial movements, and a spring exerting against the drum in a direction longitudinally of the drum axis a force acting to impart rotational and axial movement thereto.

11. A reeling mechanism comprising a hose winding drum, a mounting supporting the drum for both rotational and axial movement of the drum, a spring exerting against the drum in a direction longitudinally of the drum axis a force acting to impart rotational and axial movement thereto, a fitting part rotatable with the drum for supplying fluid to a hose carried by the drum, and a conduit connected to said swivel part and bodily rotatable with the drum for supplying fluid to hose wound on the drum, said conduit flexing between the fitting and drum in accordance with the axial travel of the drum.

12. A hose reeling mechanism comprising a hose-carrying winding drum movable axially within a predetermined range of travel according to the length of the hose, a mounting supporting the drum for both rotational and axial movements, spring means operable to exert against the drum and in a direction longitudinally of the drum axis a force displacing the drum axially throughout said range, and a flexible conduit bodily rotatable with the drum and longitudinally deflectible in accordance with the drum travel and through which fluid is supplied to the hose.

13. A reeling mechanism comprising a winding drum, a mounting supporting the drum for both rotational and axial movements, and a spring for exerting against the drum in a direction longitudinally of the drum axis a force acting to impart rotational and axial movement thereto, said drum being axially displaceable from a starting position to compress said spring upon rotation of the drum in a hose unwinding direction and the spring then acting to return the drum to said starting position.

14. A hose reeling mechanism comprising a tubular housing having an opening for passing the hose, a winding drum to carry the hose and mounted in said housing for rotational and axial movement to permit withdrawal and take-up of the hose through said opening, and spring means positioned in longitudinal alinement with the drum within the housing and exerting against the drum and in a direction longitudinally of the drum axis a force imparting rotational and axial movements thereto in a hose take-up direction.

15. A hose reeling mechanism comprising a housing having an opening for passing the hose, a winding drum to carry the hose and mounted in said housing for rotational and axial movement to permit withdrawal and take-up of the hose through said opening, spring means positioned in longitudinal alinement with the drum within the housing above the drum and exerting against the drum in a downward direction longitudinally of the drum axis a force imparting rotational and axial movement thereto in a take-up direction.

16. A reeling mechanism comprising a screw shaft, a nut on the shaft, a winding drum surrounding the shaft and associated with the nut, the drum and nut being rotatable and movable longitudinally of the shaft in response to force acting in the direction of the drum axis, and a spring received within the drum and applying to the nut and drum in a direction longitudinally of the drum axis a force imparting both rotational and axial movements to the drum.

17. A hose reeling mechanism comprising a tubular housing having a hose passing opening, a screw shaft extending longitudinally within the housing, a nut on the shaft, a hose winding drum surrounding the shaft and associated with the nut for rotational and axial movement therewith to permit withdrawal and take-up of the hose at the fixed location of said opening, the thread pitch of the screw shaft being sufficiently great that the drum is movable by endwise pressure both rotationally and axially, and spring means exerting against the nut and drum in a direction longitudinally of the drum axis a force acting to impart rotational and axial movements thereto in a hose take-up direction.

18. A hose reeling mechanism comprising a tubular housing, having a hose passing opening, a screw shaft extending longitudinally within the housing, a nut on the shaft, a hose winding drum surrounding the shaft and associated with the nut for rotational and axial movement therewith to permit withdrawal and take-up of the hose at the fixed location of said opening, a coil spring extending about the shaft above and within the drum and applying to the drum in a direction longitudinally of its axis a force imparting rotational and axial movements thereto in a hose take-up direction, a swivel fluid supply fitting at the lower end of the shaft below the drum, and a flexible conduit bodily rotatable with the drum and longitudinally deflectible in accordance with the drum travel, said conduit being connected to said swivel and drum to supply fluid to the drum-carried hose.

19. A reeling unit, comprising in combination a shell having a lateral opening, a spooling drum in the shell, a flexible element spooled on the drum and having a portion extending through the opening exteriorly of the shell, cooperating screw and nut means mounting the drum for helical movement along the axis of the drum, means including a coil spring positioned coaxially of the drum and acting on the drum to translate the drum endwise and thereby cause the screw and nut means to rotate it in a direction to spool the flexible element on the drum, the force applied by the spring increasing with the length of flexible element unspooled from the drum.

EARNEST E. MARTIN.

REFERENCES CITED

The following references are of record in the file of this patent:

UNITED STATES PATENTS

| Number | Name | Date |
|---|---|---|
| 362,304 | Metzger | May 3, 1887 |
| 551,331 | Gray | Dec. 10, 1895 |
| 599,771 | Devereaux | Mar. 1, 1898 |
| 1,153,188 | Block | Sept. 14, 1915 |
| 1,458,115 | Caldwell | June 5, 1923 |
| 1,683,911 | Morris | Sept. 11, 1928 |
| 2,181,521 | Reade | Nov. 28, 1939 |
| 2,193,288 | Liley | Mar. 12, 1940 |
| 2,334,141 | Zierden | Nov. 9, 1943 |